United States Patent [19]

Pierrat

[11] Patent Number: 4,487,091
[45] Date of Patent: Dec. 11, 1984

[54] SPEED REDUCER AND METHOD FOR REDUCING BLACKLASH

[76] Inventor: Michel A. Pierrat, 48 Farrwood Dr., Andover, Mass. 01810

[21] Appl. No.: 344,886

[22] Filed: Feb. 1, 1982

[51] Int. Cl.³ .................. F16H 1/28; F16H 13/10; F16H 55/18
[52] U.S. Cl. ............................. 74/805; 74/211; 74/409
[58] Field of Search ............ 74/805, 804, 788, 785, 74/211, 212, 406, 409, 410, 411, 397; 411/398; 403/351, 350, DIG. 7

[56] References Cited

U.S. PATENT DOCUMENTS

| | | | |
|---|---|---|---|
| 1,682,563 | 8/1928 | Hill | 74/462 |
| 2,250,259 | 7/1941 | Foote, Jr. | 74/805 X |
| 3,144,791 | 8/1964 | Menge, Sr. | 74/805 X |
| 3,303,713 | 2/1967 | Hicks | 74/801 X |
| 3,429,393 | 2/1969 | Lorence | 74/805 X |
| 3,738,114 | 6/1973 | Lorence | 74/805 |
| 3,783,712 | 1/1974 | Colinet | 74/805 |
| 3,943,787 | 3/1976 | Hicks | 74/410 |
| 3,983,764 | 10/1976 | Hicks | 74/411 X |
| 3,985,047 | 10/1976 | Therkelsen | 74/805 |
| 3,998,112 | 12/1976 | Pierrat | 74/805 |
| 4,050,331 | 9/1977 | Braren | 74/804 |
| 4,117,746 | 10/1978 | Pierrat | 74/805 |
| 4,271,726 | 6/1981 | Ryffel | 74/805 |
| 4,408,503 | 10/1983 | Kraus | 74/211 X |

FOREIGN PATENT DOCUMENTS

| | | | |
|---|---|---|---|
| 0600469 | 10/1930 | Fed. Rep. of Germany | 74/804 |
| 0611304 | 1/1931 | Fed. Rep. of Germany | 74/804 |
| 0167164 | 5/1959 | Sweden | 74/805 |

*Primary Examiner*—Allan D. Herrmann
*Assistant Examiner*—Stephen B. Andrews
*Attorney, Agent, or Firm*—E. Thorpe Barrett

[57] ABSTRACT

A method and apparatus for minimizing backlash and improving the efficiency of speed reduction mechanisms in which a series of rollers are equally spaced in a circle on a disk to perform operationally somewhat like an internal ring gear. Mounted for eccentric movement and simultaneously engaging each of the rollers is an orbital rotor having a perimeter defined by an epitrichoid curve with a number of lobes equal to one less than the number of rollers. The rotor is mounted for free rotation on an eccentric keyed to a drive shaft. Rotation of the drive shaft causes the rotor to move orbitally and to rotate with a speed reduction equal to the reciprocal of the number of lobes on the rotor. Each roller is mounted for controlled omnidirectional compliance and preloaded to provide a controlled pressure between each roller and the adjacent surface of the rotor. The outer surface of each roller is crowned to increase the efficiency and prevent binding that might be caused by angular deflection of the roller.

Each roller is mounted on a shaft that is press-fitted into an eccentric bore in a mounting sleeve that is enlarged near the roller to provide for controlled deflection of the shaft as the sleeve is rotated in its mounting. Each roller is individually adjusted to produce a controlled preload pressure between the roller and the rotor.

16 Claims, 10 Drawing Figures

SPEED REDUCER AND METHOD FOR REDUCING BLACKLASH

BACKGROUND OF THE INVENTION

1. Field of the Invention

This invention relates to speed reduction and the minimization of backlash to provide a speed reduction mechanism having high efficiency and minimal backlash and which is suitable for precision motion control applications.

2. Description of the Prior Art

Speed reduction mechanisms making use of epicyclical movements and gears having a perimeter defined by an epitrochoid curve have long been known. The magazine Design News in its Aug. 18, 1961 issue describes a single-stage cycloidal cam that forms the basis of a speed reducing mechanism. A similar structure is shown in U.S. Pat. No. 1,682,563 to Hill. Corresponding devices were previously known that made use of spur gears. U.S. Pat. No. 2,250,259 to Foote, Jr. describes such a heliocentric unit. Other related mechanisms are described in U.S. Pat. Nos. 3,429,393; 3,783,712; and 3,144,791. Some of these mechanisms incorporate two stages so that the output shaft is in line with the input shaft and rotates in the same direction. None of these patents discloses any structure for the practical elimination of backlash. The presence of backlash has been a major limitation in the application of earlier devices which, although practical for straight speed reduction applications, are not suitable for precison motion control applications where direction reversal is a requirement. For example, in positioning the arm of a robot, it is desirable to drive the arm from a high speed motor through a speed reduction unit and necessary that the arm be positioned exactly the same irrespective of the direction from which the position is approached. None of the above prior art mechanisms meets this requirement.

SUMMARY OF THE INVENTION

The invention is embodied in a mechanism related to that disclosed in U.S. Pat. No. 3,998,112 in which a series of rollers are equally spaced in a circle on a disk to perform operationally somewhat like an internal ring gear. Mounted for eccentric movement and simultaneously engaging each of the rollers is an orbital rotor having a perimeter defined by an epitrochoid curve with a number of lobes equal to one less than the number of rollers. The rotor is mounted for free rotation on an eccentric keyed to a drive shaft. Rotation of the drive shaft causes the rotor to move orbitally and to rotate with a speed reduction equal to the reciprocal of the number of lobes on the rotor. A similar structure may serve as a second stage with a second orbital rotor driven by the first rotor and moved orbitally by the same eccentric. The second stage provides a further speed reduction and an output drive, connected to the disk supporting the rollers in the second stage, that is in alignment with the input drive shaft.

The present invention comprises an improvement on the foregoing mechanism in which wear is reduced and backlash is substantially eliminated, converting the speed reduction mechanism into a highly practical motion control unit. In carrying out the method of this invention, each of the rollers is individually adjusted to bring it into engagement with the rotor under controlled pressure. In the structure embodying the invention, each of the rollers may be mounted for controlled omnidirectional compliance and preloaded to provide a controlled pressure between each roller and the adjacent surface of the rotor. The outer surface of each roller, or the outer surface of the rotor, is crowned to increase the efficiency and prevent binding that might be caused by angular deflection of the roller. In addition to the advantages pointed out above, the controlled compliance results in automatic compensation for wear so that the mechanism can be operated for relatively long periods of time without adjustment while retaining its anti-backlash advantage.

The resulting motion control unit has widespread application not only as a speed reducer, but wherever it is important that the position of the output drive retain a positive relationship with respect to the input drive irrespective of the direction from which that position is approached. Such a motion control unit has important application, for example, as a robot joint coupling a high speed motor to an operating arm.

DESCRIPTION OF THE PREFERRED EMBODIMENT

Figure 1:
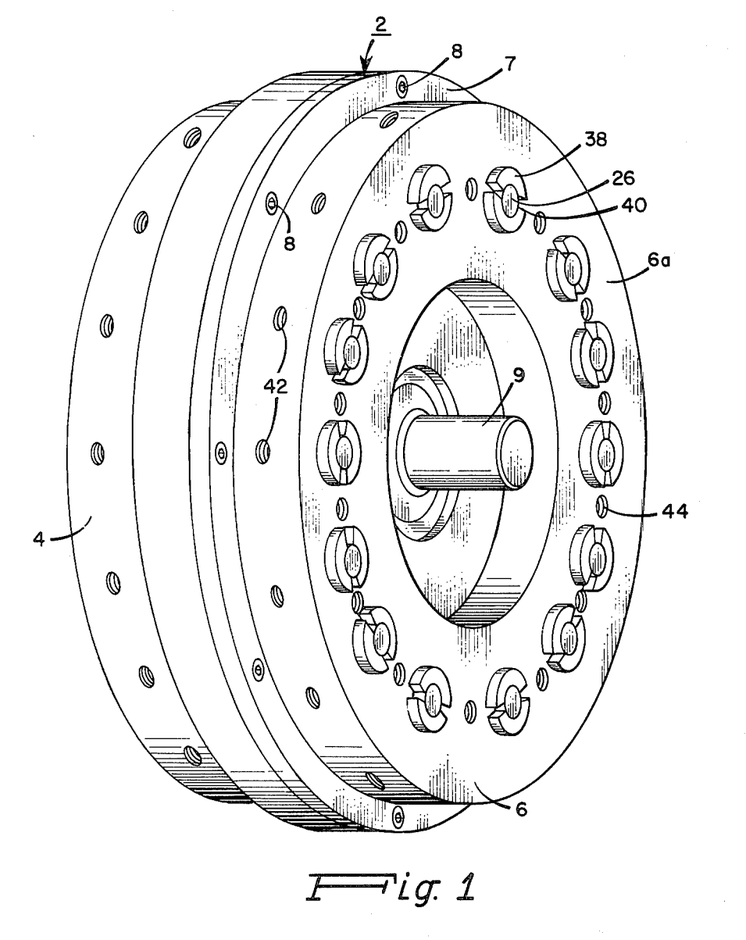
FIG. 1 is a perspective view of a motion control unit embodying the invention.

As shown in FIG. 1, the unit is enclosed in a housing, generally indicated at 2, formed of a fixed reaction section 4 and a rotatable output section 6, the two sections being maintained in face-to-face relationship by a flange 7 fastened with screws 8.

Figure 4:
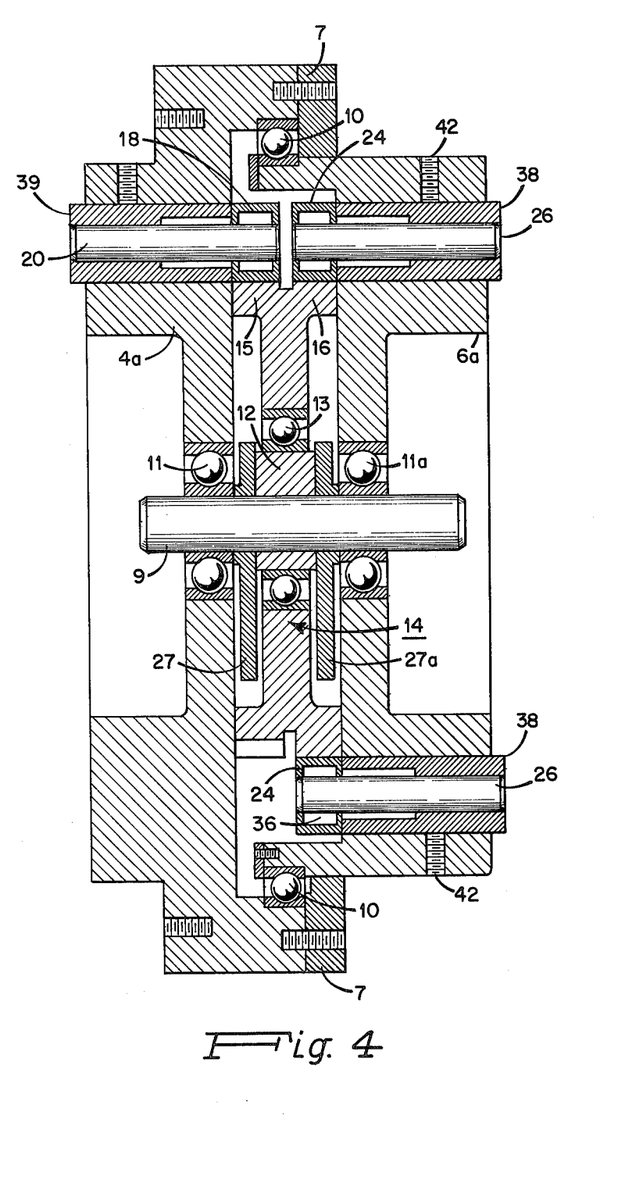
FIG. 4 is a sectional view along line 4—4 of FIG. 3.

In the unit illustrated, a speed reduction of 196:1 is attained between the rotary speed of an input drive shaft 9 and the output housing section 6, the housing section 6 being rotatably mounted by means of a ring bearing 10 (FIG. 4) between the two housing sections.

Figure 2:
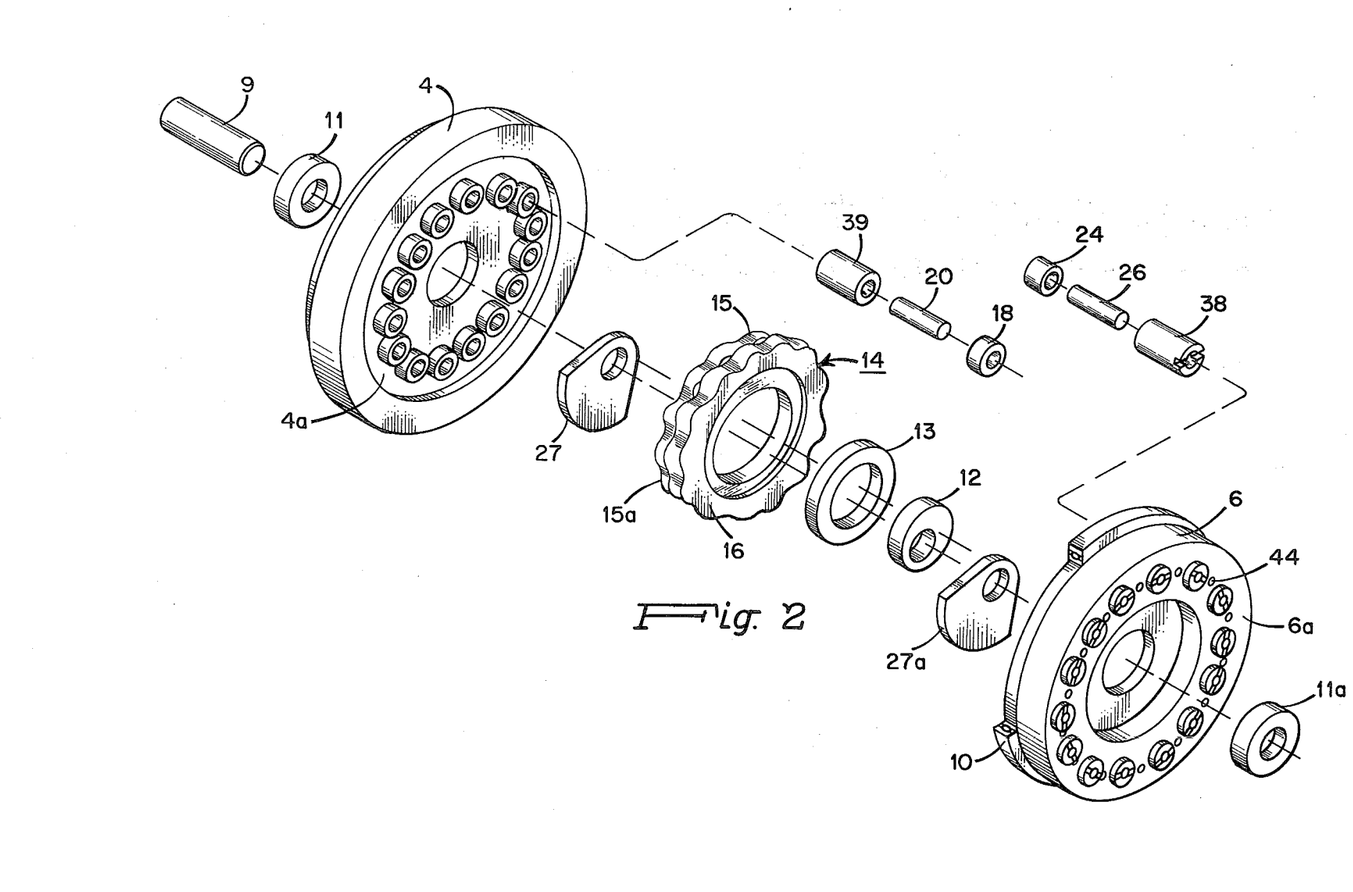
FIG. 2 is a diagrammatic exploded view illustrating the arrangement of certain components of the unit.

The shaft 9 is supported by two bearings 11 and 11a (shown diagrammatically in FIGS. 2 and 4) mounted respectively in reaction housing 4 and output housing 6. An eccentric 12 is keyed to the shaft 9 and rotates within a bearing 13 mounted in an orbital rotor assembly, generally indicated at 14, comprising a reaction stage orbital rotor 15 and an output stage orbital rotor 16.

Fifteen rollers 18, each supported by a shaft 20, are mounted on a reaction disk 4a, formed integrally with the housing section 4, and arranged equally spaced in a circle to form an operating structure somewhat similar to an internal ring gear that cooperates with the reaction stage rotor 15.

The perimeter of the rotor 15 is formed by a series of fourteen external lobes 15a defined by an epitrochoidal curve. The radial distance between a point at the minimum radius position between two successive lobes, when the eccentric is positioned to place that point at a maximum radial distance from the center of the drive shaft 9, is equal to the distance from the center of shaft 9 to the innermost on each roller 18. Each of these rollers is at all times in contact with the outer surface of the reaction rotor 15.

Figure 3:
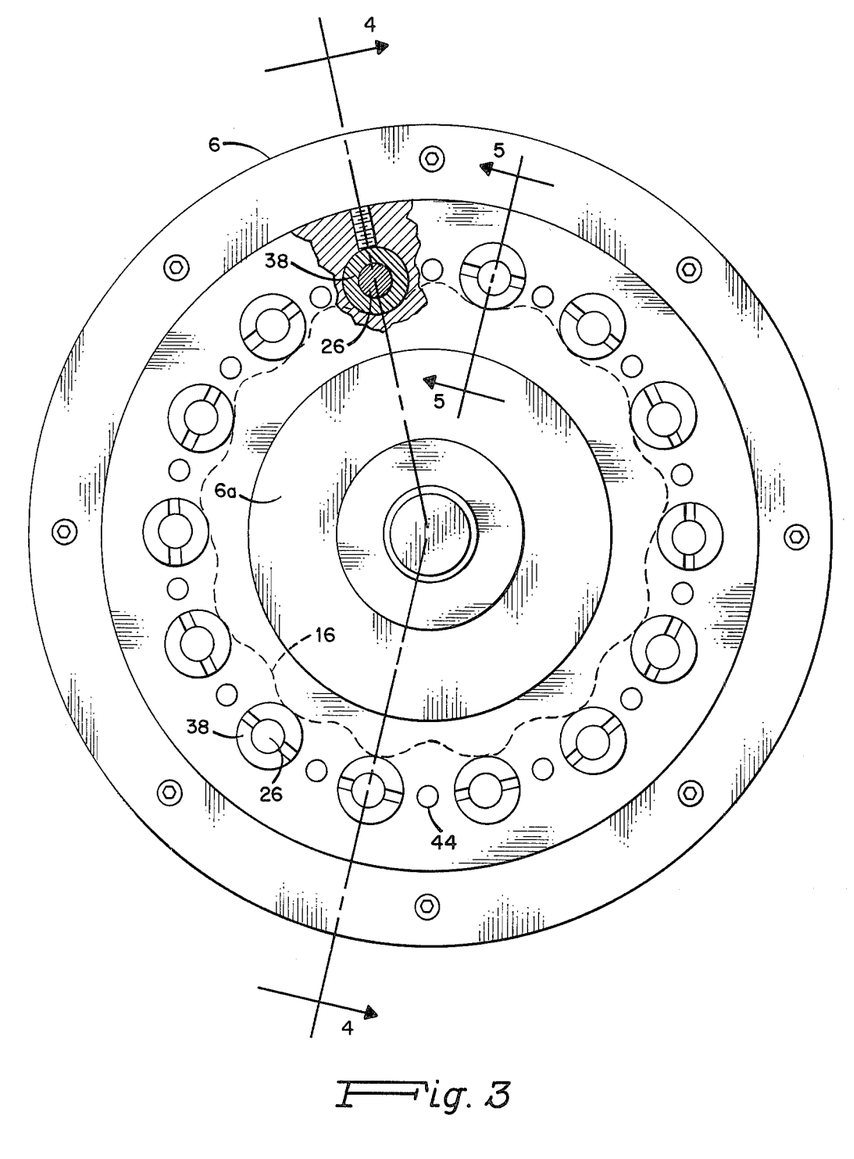
FIG. 3 is an elevation of the output end of the motion control unit with a section cut away to show the internal construction.

An output stage disk 6a, formed integrally with the housing 6, supports a similar series of fourteen rollers 24 arranged in a circle and each rotatably supported by a shaft 26. These rollers are simultaneously engaged by the outer surface of the output stage rotor 16, as shown in broken lines in FIG. 3, which is also in the form of an epitrochoid curve, but in this instance has thirteen lobes. Two counterweights 27 and 27a compensate for the out of balance moments of the two rotors in the same manner as described in U.S. Pat. No. 3,998,112.

When the input shaft 9 is driven, the eccentric 12 causes the reaction rotor 15 to move orbitally, during which movement the outer surface of the rotor remains at all times in contact with each of the reaction stage rollers 18. This orbital movement of the rotor causes it to revolve about its own axis at a speed equal to one-fourteenth the speed of the shaft 9 and in the opposite direction.

The output stage rotor 16, which is either secured to or formed integrally with the rotor 15, is thus positively driven in a direction opposite from the direction of rotation of the input shaft 9 while being moved orbitally by the eccentric 12. This stage provides a further speed reduction so that the overall reduction is 196:1.

The mechanism so far described is similar in structure and operation to that described in applicant's U.S. Pat. No. 3,998,112. That mechanism and earlier similar devices are not suitable for applications where minimal backlash and high efficiency are required.

Limitations in machining accuracy and the effects of environmental and operational factors, such as temperature changes and stress resulting from applied loads, prevent the construction by usual methods of a precision unit free of backlash. Limited tolerances in the dimensions must be present to prevent the unit from binding, jamming or operating at low efficiency and these tolerances introduce backlash that is unacceptable for many applications. Such units also, if not perfectly machined, cause an excessive load to be applied to the input shaft resulting in excessive bearing wear.

In this structure, the rollers 18 of the reaction stage and the rollers 24 of the output stage are supported by a structure providing omnidirection controlled compliance and are preloaded as illustrated by FIGS. 5–9. The rollers 18 and 24 are mounted in an identical manner and details are shown only of the roller mounting in the output stage. The roller 24 is rotatably mounted on the shaft 26, preferably by means of a needle bearing 36 (shown only in FIG. 4), that is press fitted at its base end into an eccentric sleeve 38. The sleeve 38 is rotatably positioned in a bore in the reaction disk. An identical sleeve 39 is provided for each shaft 20 in the reaction stage.

Figure 5:
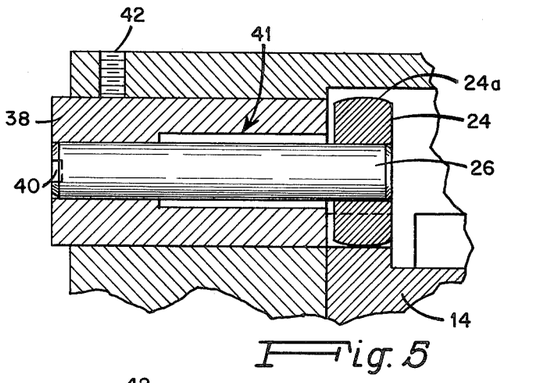
FIG. 5 is an enlarged partial section along line 5—5 of FIG. 3 showing the mounting of the rollers.
Figure 6:
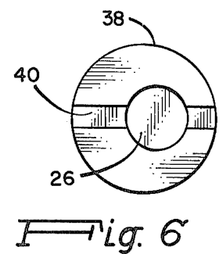
FIG. 6 is an end view of FIG. 5.

To permit controlled compliance of the roller 24, the internal diameter of the sleeve 38 near the roller 24 is enlarged, as indicated at 41 in FIG. 5, so that the roller support shaft 26 makes contact with the sleeve only in the base area. For example, the sleeve may be 1.75 inches in length with a minimum diameter of 0.5 inch into which the shaft 26 is pressed. For one inch of the sleeve 38 nearest the roller 24 the internal diameter is enlarged by 0.003 inch. When transverse force is applied to the roller 24, it causes the shaft to deflect, in a direction opposite to the force, for a maximum distance of 0.0015 inch. These dimensions are by way of example only; the actual dimensions of the elements and the permitted compliance depends upon the machining accuracy, anticipated load conditions, reduction ratios and other factors.

Figure 7:
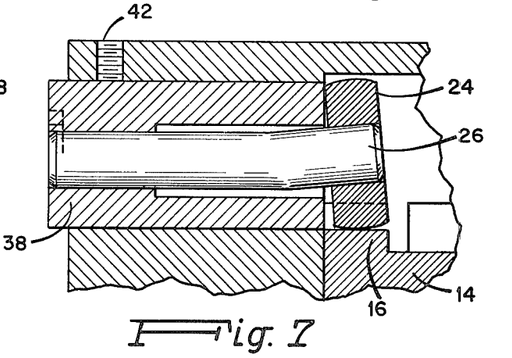
FIG. 7 is a view similar to FIG. 5 showing an exaggerated deflection of the roller after preloading.
Figure 8:
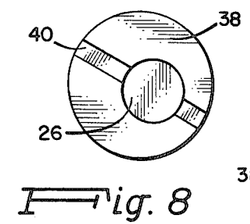
FIG. 8 is an end view of FIG. 7.

FIG. 7 illustrates, in exaggerated form, the deflection of the roller 24. The surface of each of the rollers 18 and 24 is slightly crowned, as shown at 24a in FIG. 6, to permit deflection of the shaft and minimize binding and wear. Alternatively, the outer surfaces of the rotors 15 and 16 may be crowned, in a direction parallel with the axis of the shaft 9, to produce a similar result.

Figures 9, 10:
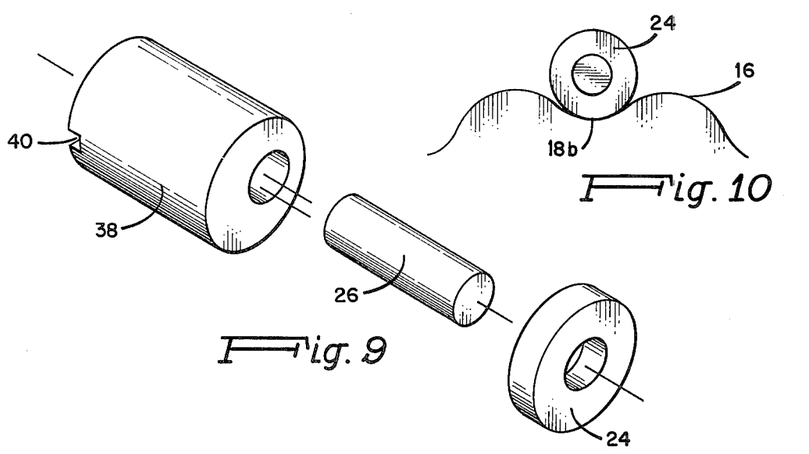
FIG. 9 is an exploded perspective view of the major components of the roller assembly.
FIG. 10 is a partial view showing the desired position of a roller during the cam adjustment.

To provide the desired preloading, the bore in the sleeve 38 is eccentric with respect to the cylindrical outer surface. The sleeve can be rotated within its supporting bore in the reaction disk by a suitable tool (not shown) engaging a notch 40 in the exposed end of the sleeve 38. As illustrated in FIG. 10, the roller 24 is engaged with the bottom of one of the valleys between two adjacent lobes of the rotor 16. If the sleeve 38 is then rotated by a tool engaging the notch 40, the pressure between the roller 24 and the rotor 16 can be increased causing deflection of the roller 24 and the shaft 26 as illustrated by FIG. 7.

In use, the preloading of one of the rollers 24 is accomplished by positioning one of the rollers in a valley between two adjacent lobes on the rotor 16 and rotating the sleeve 38 with a torque wrench until a predetermined force is registered, the deflection of the shaft 26 always being within its elastic limit. The preload may typically be 10–15%, but may be as much as 100%, of the force generated when torque is applied at the rated load. The sleeve is then locked in position by means of a set screw 42. This process is repeated for each roller 24 on the output disk 6a and each roller 18 on the reaction disk 4a. This preload procedure creates some, essentially linear, deflection of the roller which may be, for example, of the order of 0.001 inch in a direction dependent upon the relative position of the particular roller and the surface of the associated rotor.

This preloading in cooperation with the controlled omnidirectional compliance prevents binding of the mechanism while equalizing the load among all of the rollers. Because the forces at the nodes of the lobes can approach infinity, effective load sharing among the rollers is achieved. Each roller on both disks is at all times in contact with the surface of the cooperating rotor and is maintained in firm engagement by the preloading. The support for the rollers must be sufficiently rigid that the roller is not substantially deflected because of the load applied to the unit yet sufficiently compliant to compensate for other factors and prevent backlash. This arrangement permits reversal of the direction of drive without significant backlash, an important advantage in motion control applications. For example, the mechanism just described has valuable application as a robot joint. The presence of this controlled compliance also provides automatic compensation for wear, maintaining the antibacklash characteristics without frequent adjustment of the unit. The shaft 9 may, for example, be driven by a servo motor, while the output disk, whose speed has been reduced by a factor of 196, is rigidly connected to an operating arm, for example, by means of threaded holes 44 (FIGS. 1–3) in the disk 6a, to provide precision location of the arm relative to the position of the drive shaft 9 irrespective of the direction from which the position was approached.

It will be noted that the individual adjustment of the roller positions, even without the controlled compliance, is an important contribution to the operation of the unit by compensating for machining tolerances, reducing wear, minimizing load on the rotor eccentric and shaft assembly, and aiding in the distribution of the load among all of the rollers. The position of the rollers may be adjusted one-by-one while each roller is positioned at the bottom of a valley between two adjacent lobes. It should be noted, however, that the rotors 15 and 16 are not supported by the drive shaft 9, but respectively by the two sets of rollers 18 and 24 and, by the use of a suitable machine, it is possible to adjust all of the rollers on one stage simultaneously, an adjustment that can be made irrespective of whether the shaft 9 is in position.

The stated number of rollers and lobes is by way of illustration only and any number may be used in accordance with the speed reduction requirements.

From the foregoing it will be seen that the motion control unit that is the subject of this application has a variety of potential uses, can be readily manufactured and is economical in cost. As with all mechanical devices of this nature, this structure is subject to a variety of modifications without departing from the scope of this invention.

I claim:

1. A motion control unit comprising
    a central rotor having a perimeter defined by a smooth curve forming a plurality of equally-spaced lobes,
    rotary drive means,
    means coupled to said drive means arranged to produce orbital movement of said rotor,
    a plurality of equally-spaced rollers arranged on a circle and surrounding said rotor,
    each of said rollers making simultaneous contact with said rotor, and
    means for individually adjusting each of said rollers in the plane of said rotor to bring each roller into pressure engagement with said rotor.

2. Apparatus as claimed in claim 1 including
    a plurality of compliant support means each supporting one of said rollers,
    said means for individually adjusting said rollers being arranged to cause deflection of said compliant support means.

3. Apparatus as claimed in claim 1 or claim 2 wherein at least one of the engagement surfaces between each of said rollers and said rotor is crowned in a direction transverse to the direction of rotation of the said roller.

4. Apparatus as claimed in claim 3 wherein the surface of each of said rollers in engagement with said rotor is crowned in a direction transverse to the direction of rotation of the said roller.

5. Apparatus as claimed in claim 4 wherein
    said means for individually adjusting said rollers includes for each roller a roller-support shaft carrying the said roller,
    adjustable force-generating means applying a controlled pressure between the said roller and said rotor, and
    means for locking said adjustable force-generating means to retain said controlled pressure.

6. Apparatus as claimed in claim 2 including
    disk means,
    said compliant support means including a plurality of roller-support shafts carried by said disk means each of said shafts rotatably supporting one of said rollers and being free at the point of engagement with said roller for omnidirectional compliance of at least 0.001 inch, and
    means providing a positive limit to the angular deflection of each of said rollers as a result of forces generated on each said roller in a direction away from said rotor transverse to the axis of its said associated roller-support shaft, said positive limit being within the elastic limit of the said roller support shaft.

7. Apparatus as claimed in claim 6 wherein
    said means limiting the angular deflection of each of said rollers comprises
    a plurality of sleeves supported by said disk means and each surrounding one of said roller-support shafts and having a first bore section in close engagement with the portion of said shaft farthest from its associated roller and a second bore section adjacent said roller and of larger diameter than the portion of the said shaft enclosed thereby.

8. Apparatus as claimed in claim 7 wherein
    the surface of each of said rollers in engagement with said rotor is crowned in a direction transverse to the direction of rotation of the said roller.

9. Apparatus as claimed in claim 7 wherein
    said bore sections of each of said sleeves are eccentric with respect to the outer circumference of the said sleeve, and
    each of said sleeves is rotatably mounted in said disk means whereby a controlled force is produced between each said roller and said rotor by rotation of its associated sleeve, and including
    means for locking said sleeve against rotational movement thereby to maintain said controlled force.

10. A motion control unit comprising
    disk support means,
    a plurality of sleeves rotatably mounted in and extending from said disk support means,
    said sleeves being equally spaced around a circle and each having an internal longitudinal bore eccentric with respect to the outer surface of said sleeve,
    a plurality of rollers,
    a plurality of roller-support shafts each carrying one of said rollers and extending into one of said sleeves and being in close engagement with said bore thereof adjacent said disk means and having a diameter adjacent the end of said sleeve farthest removed from said disk significantly smaller than the diameter of the adjacent portion of said bore,
    a rotor positioned within said rollers and having an epitrochoidal surface in simultaneous engagement with each of said rollers,
    orbital drive means coupled to said rotor, and
    means for locking the rotary position of each of said sleeves with respect to said disk means,
    whereby a predetermined force is produced between each of said rollers and the surface of said rotor by rotation of the said sleeve associated therewith.

11. In a speed reduction mechanism having a plurality of spaced rollers in simultaneous engagement with a rotor having a perimeter defined by a smooth curve forming a plurality of equally-spaced lobes,
apparatus for substantially eliminating backlash comprising
a plurality of shafts each supporting one of said rollers,
means rigidly supporting each of said shafts at a point removed from the said roller carried thereby,
and stop means supported independently of any deflection of said shafts spaced from each of said shafts adjacent the roller carried thereby and arranged to limit the deflection of said shaft and maintain it within its elastic limit.

12. Apparatus as claimed in claim 11 wherein
each of said stop means is positioned at least 0.001 inch from its associated shaft.

13. Apparatus as claimed in claim 11 including means for preloading each of said shafts to produce a predetermined pressure between each of said rollers and said rotor.

14. The method of minimizing backlash comprising the steps of
providing a speed reduction mechanism of the kind having a plurality of spaced rollers in simultaneous engagement with an orbitally driven rotor having an outer surface defined by a continuous curve forming equally spaced lobes,
mounting each of said rollers for adjustment in the plane of said rotor,
individually adjusting each of said rollers into engagement with said rotor under a controlled force, and
locking each of said rollers in position.

15. The method as claimed in claim 14 wherein
each of said rollers is mounted on a shaft and the step of individually adjusting each of said rollers creates sufficient force to angularly deflect said shaft at least 0.001 inch.

16. The method as claimed in claim 15 including the step of providing a positive stop limiting the angular deflection of each of said shafts while permitting angular deflection of at least 0.001 inch.

* * * * *

UNITED STATES PATENT AND TRADEMARK OFFICE
CERTIFICATE OF CORRECTION

PATENT NO. : 4,487,091

DATED : December 11, 1984

INVENTOR(S) : Michel A. Pierrat

It is certified that error appears in the above-identified patent and that said Letters Patent is hereby corrected as shown below:

Column 3, line 8, after "innermost" should read --point--.

Signed and Sealed this

Sixteenth Day of April 1985

[SEAL]

Attest:

DONALD J. QUIGG

*Attesting Officer*  *Acting Commissioner of Patents and Trademarks*